United States Patent [19]
DeLeo et al.

[11] Patent Number: 4,730,487
[45] Date of Patent: Mar. 15, 1988

[54] FAMILY OF AERODYNAMICALLY COMPENSATED MULTIPLE STATIC PRESSURE TUBES

[75] Inventors: Richard V. DeLeo, Hopkins; Floyd W. Hagen, Eden Prairie, both of Minn.

[73] Assignee: Rosemount Inc., Eden Prairie, Minn.

[21] Appl. No.: 740,963

[22] Filed: Jun. 4, 1985

[51] Int. Cl.$^4$ ............................................. G01C 21/00
[52] U.S. Cl. ................................... 73/182; 29/157 R; 29/557; 73/861.65
[58] Field of Search ...................... 73/182, 180, 861.65, 73/861.66, 861.67, 861.68; 29/157 R, 557, 558

[56] References Cited

U.S. PATENT DOCUMENTS

| | | | |
|---|---|---|---|
| 2,876,640 | 3/1959 | Beach et al. | 73/182 |
| 2,985,012 | 5/1961 | Wail | 73/182 |
| 3,120,123 | 2/1964 | DeLeo et al. | 73/182 |
| 3,318,146 | 5/1967 | DeLeo et al. | 73/180 |
| 3,482,445 | 12/1969 | DeLeo et al. | 73/182 |
| 3,585,859 | 6/1971 | DeLeo et al. | 73/388 |
| 3,618,388 | 11/1971 | Rose | 73/388 |
| 3,673,866 | 7/1972 | Alperovich et al. | 73/212 |
| 3,750,470 | 8/1973 | Partzsch | 73/212 |
| 3,914,997 | 10/1975 | Pinckney | 73/182 |
| 4,096,744 | 6/1978 | DeLeo et al. | 73/180 |
| 4,378,696 | 4/1983 | DeLeo et al. | 73/180 |
| 4,378,697 | 4/1983 | DeLeo et al. | 73/180 |

Primary Examiner—Donald O. Woodiel
Attorney, Agent, or Firm—Kinney & Lange

[57] ABSTRACT

A short multiple static pressure sensing probe that is compensated for both subsonic and supersonic speeds in the same probe and a family of such probes for different aircraft with each of the probes in the family having a common barrel configuration except for the final shaping of compensation surfaces and the location of static pressure sensing ports. In an assembly operation, heaters and interconnecting wires, bulkheads and pressure tubing are arranged, internal to the probe, to stay clear of predetermined areas in which static pressure ports may be located. In a finishing operation, compensation surfaces are produced and static pressure ports are created at selected locations in the predetermined areas, thus avoiding damage to internal parts. A preferred arrangement of compensation surfaces facilitates multiple subsonic and supersonic compensation by providing at least two regions of relatively constant, but selectable, supersonic compensation pressures that coincide along the length of the barrel with two regions of variable subsonic pressures. The supersonic compensation in this preferred arrangement is adjusted to the desired levels by selecting two of the compensation surfaces. The subsonic compensation is then adjusted by selecting a second two of the compensation surfaces and the location of the static pressure ports.

11 Claims, 8 Drawing Figures

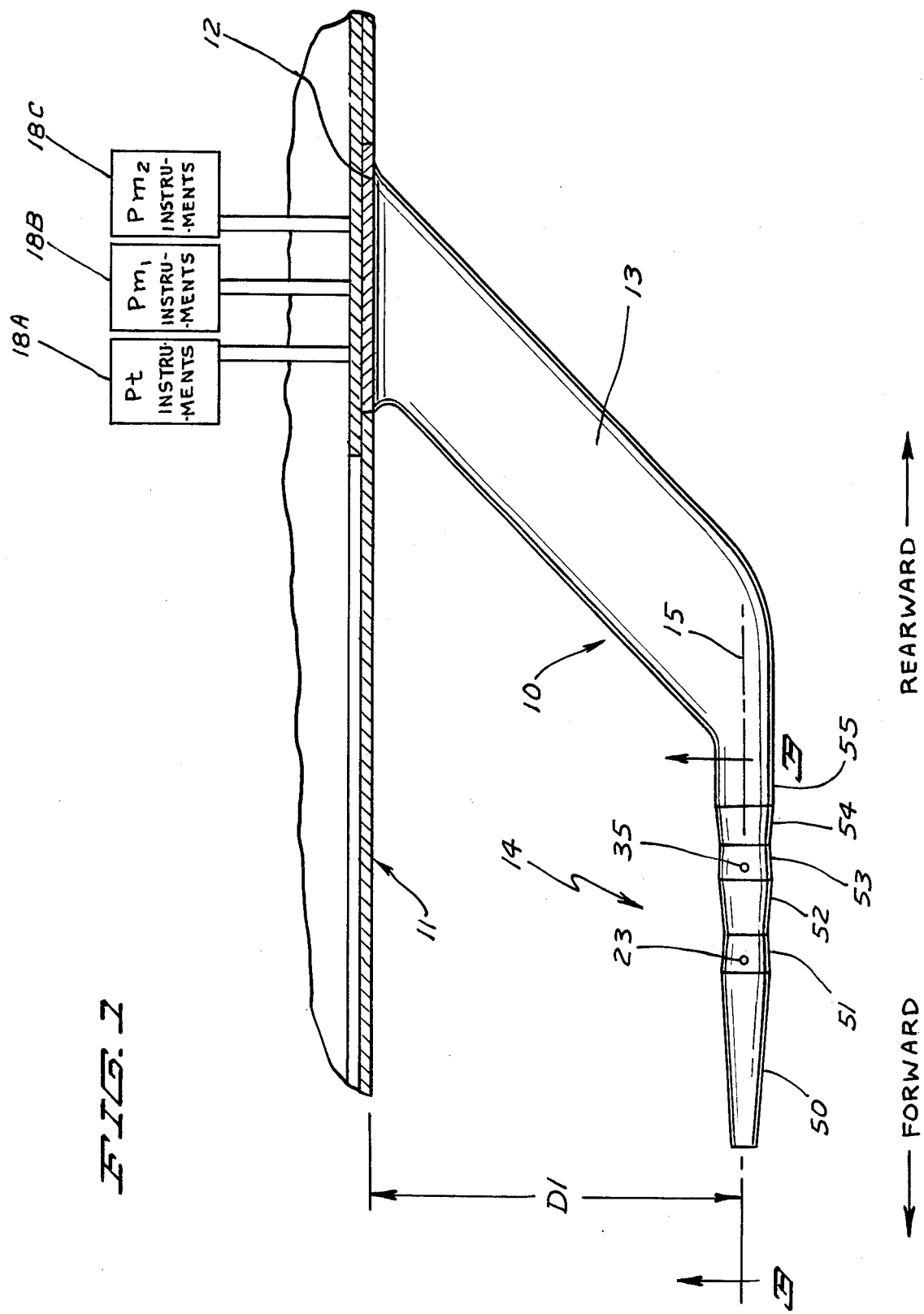

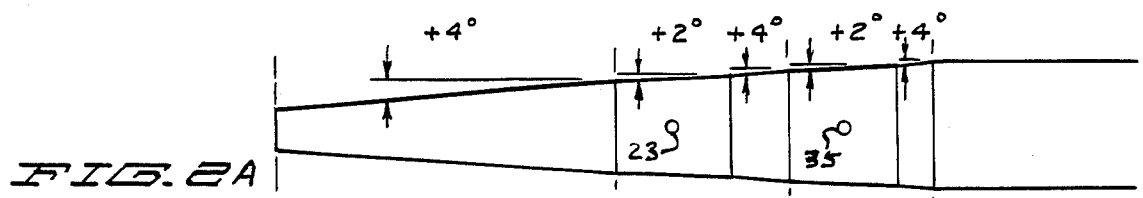
FIG. 2A
FIG. 2B
FIG. 2C
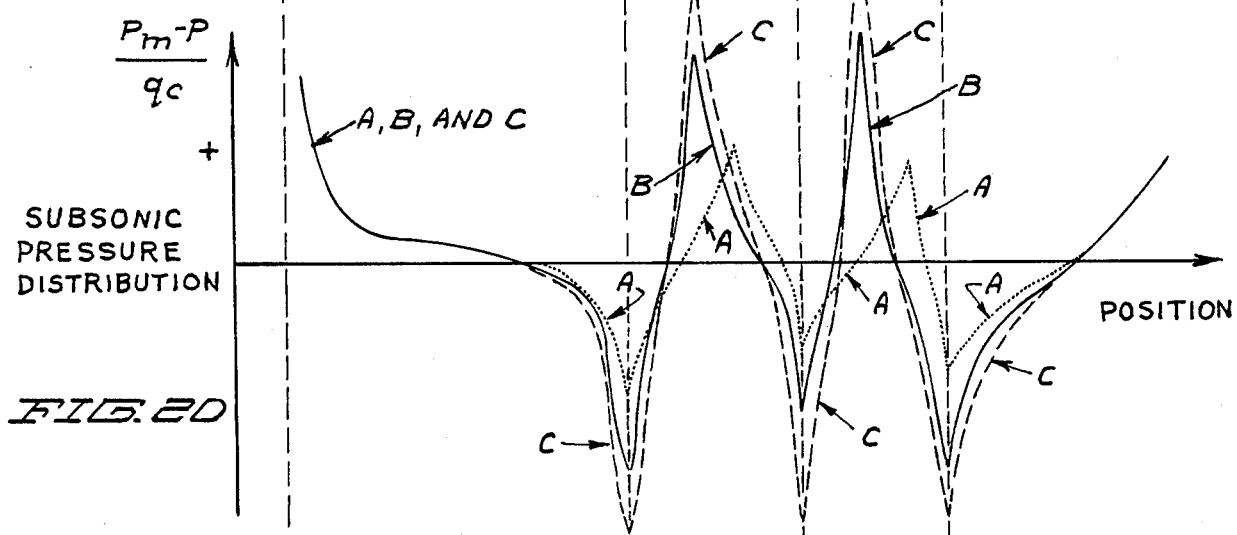
FIG. 2D
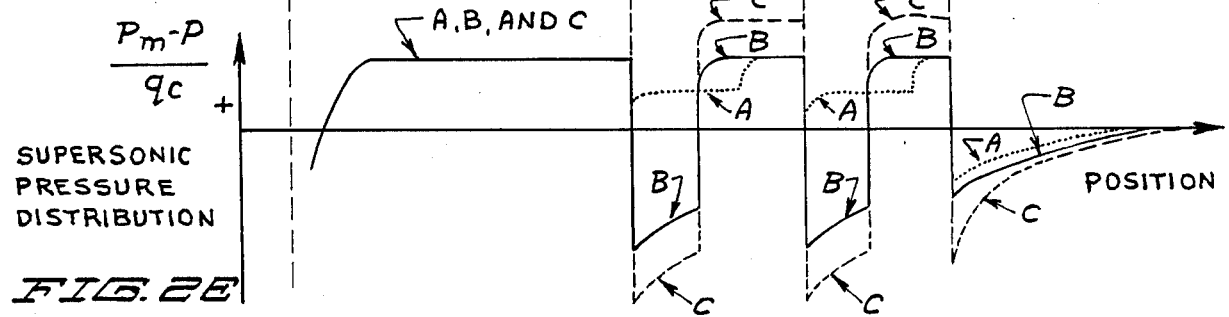
FIG. 2E

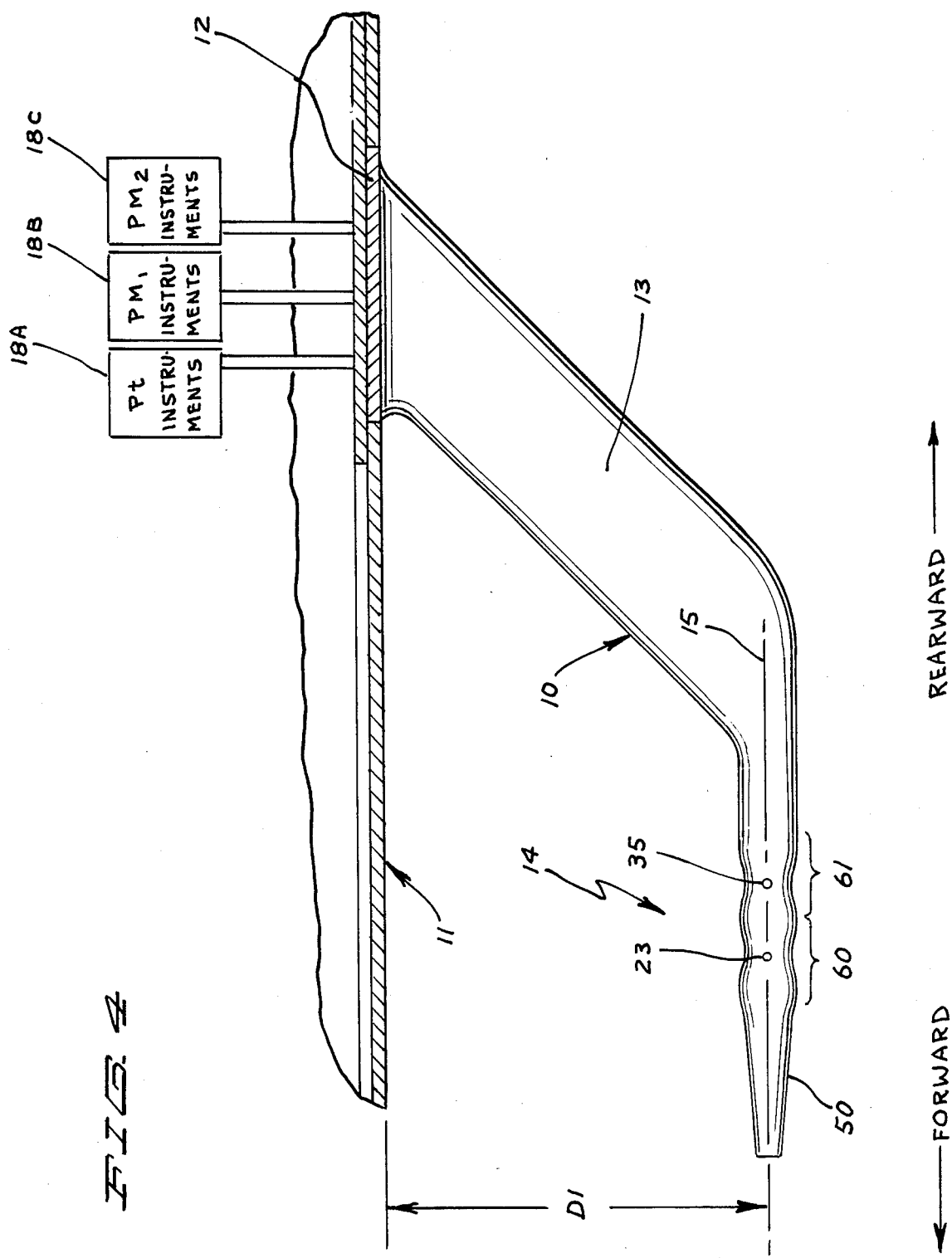

FAMILY OF AERODYNAMICALLY COMPENSATED MULTIPLE STATIC PRESSURE TUBES

BACKGROUND OF THE INVENTION

Field of the Invention.

This invention relates to multiple static pressure measuring systems using one external probe for measuring static pressure and providing compensation for both subsonic and supersonic operation. This invention also relates to a family of such probes having the novel characteristic of utilizing a common construction and different external surface shapes or pressure port locations to provide compensation.

SUMMARY OF THE INVENTION

The present invention relates to short multiple static pressure sensing probes that are conveniently compensated for both subsonic and supersonic speeds in the same probe. A family of such probes for different aircraft is developed with each of the probes in the family having a common barrel configuration except for the final shaping of compensation surfaces and the location of static pressure sensing ports. In an assembly operation, heaters and interconnecting wires, bulkheads and pressure tubing are arranged, internal to the probe, to stay clear of predetermined areas in which static pressure ports may be located. In a finishing operation, compensation surfaces are produced and static pressure ports are created at selected locations in the predetermined areas, thus avoiding damage to internal parts.

A preferred arrangement of compensation surfaces in this invention facilitates multiple subsonic and supersonic compensation by providing at least two regions of relatively constant, but selectable, supersonic compensation pressures that coincide along the length of the barrel with two regions of variable subsonic pressures. The supersonic compensation in this preferred arrangement is adjusted to the desired levels by selecting two of the compensation surfaces. The subsonic compensation is then adjusted by selecting a second two of the compensation surfaces and the location of the static pressure ports.

BRIEF DESCRIPTION OF THE DRAWINGS

FIG. 1 is a top plan view of a probe made according to the present invention installed on a portion of an aircraft;

FIGS. 2A-2C are representations of a family of probes made according to the present invention and FIGS. 2D and 2E are graphical representations of normalized pressure patterns plotted in relation to the lengths of probes in the family of probes shown in FIGS. 2A-2C;

FIG. 4 is a top plan view of an alternative probe made according to the present invention.

DESCRIPTION OF THE PREFERRED EMBODIMENT

Figure 3:
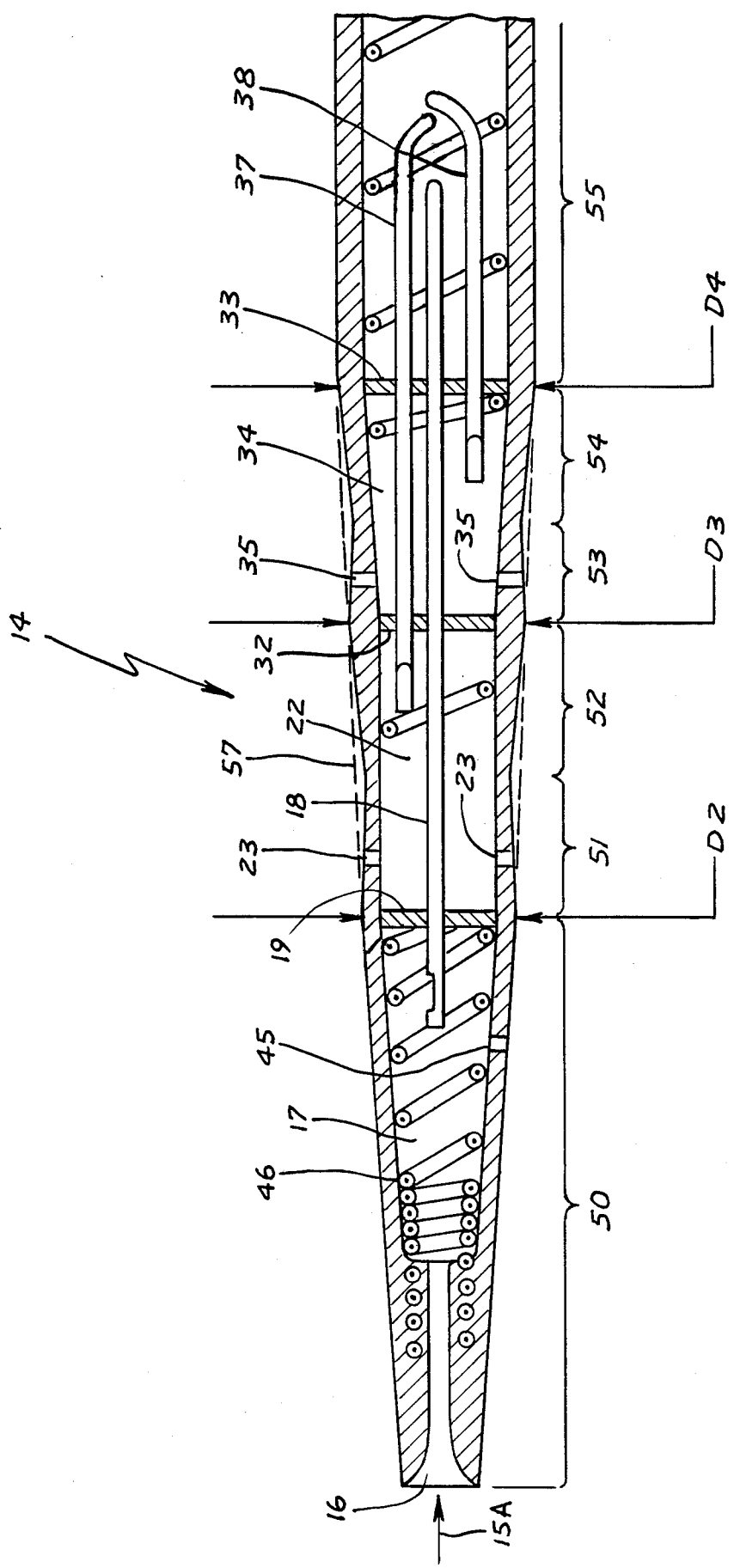
FIG. 3 is a sectional view taken as on line 3—3 in FIG. 1.

In FIG. 1, a dual static pressure sensing probe illustrated generally at 10 is mounted onto portions of an external surface such as a fuselage of an aircraft 11 with suitable mounting means and has a base member 12 that is used to support a laterally outwardly extending strut 13. A tubular probe barrel section 14 is integral with an outer end of the strut 13 and has a longitudinal axis 15 oriented in a predetermined position with respect to the normal axis of flight of the aircraft. While the probe illustrated here is strut-mounted, it is equally possible for the probe to be mounted on a boom, a wing, or another control surface.

The strut 13 is streamlined, of course, to minimize drag effect, and it is made so that it will space the barrel portion 14 a predetermined distance D1 from the side of the external surface of fuselage 11 so that the barrel is out of the influence of the boundary layer of air on the fuselage.

The probe shown is a combination pitot-static sensing probe, and referring to FIG. 3, it can be seen that the forward end of the barrel member has a port 16 which faces forwardly and senses the impact pressure of a fluid flow stream 15A on the probe. The port 16 opens into a chamber 17 from which a pitot or impact pressure tube 18 extends. The end of tube 18 in chamber 17 is closed and has an opening near the end to sense pressure. The tube 18 is suitably connected to instruments 18A in the aircraft. A bulkhead 19 on the interior of the barrel portion separates the chamber 17 from a first static pressure sensing chamber 22 which is open to the atmosphere through one or more static sensing ports 23. There are two diametrically opposed ports 23 that open into the chamber 22. An electrical deicing heater 46 is shown on the interior surface of the probe and a drain hole 45 is provided for moisture exhaust.

As shown, the probe barrel has a forward or leading end. External frustoconical surface 50 extends from the forward end of the barrel back to a diametral plane where the probe barrel has a diameter designated as D2. A second bulkhead 32 is positioned in the barrel portion of the probe to seal off chamber 22. A third bulkhead 33 as shown is provided to define a second static pressure chamber 34. The second static chamber 34 is completely isolated from the chamber 22. One or more static pressure sensing ports 35 are defined through the wall of the barrel and open into the chamber 34. Ports 35 comprise two diametrically opposed ports that are spaced axially along the probe from ports 23. The axes of ports 35 and 23 are aligned, however, in a plane through probe axis 15. A first static pressure sensing tube 37 leads from chamber 22 to suitable primary instruments 18B in the aircraft compartment, and a second static pressure line 38 leads from the chamber 34 to instruments 18C.

While the chamber 34 is shown as defined with a third bulkhead 33, the chamber 34 could extend all the way to the back end of the probe and actually up into the strut if desired. The chamber 34, however, is sealed from the chamber 22 by the bulkhead 32.

Extending back from the diametral plane at diameter D2 to a radial plane where the probe barrel has a larger diameter designated as D3 are two successive frustoconical surfaces 51 and 52. "Successive" means the surfaces merge together at a juncture line with only a small radius at the juncture. Static pressure compensation at both subsonic and supersonic speeds is provided to ports 23 by surfaces 51 and 52.

Extending back from the diametral plane at diameter D3 to a diametral plane where the probe barrel has an even larger diameter designated as D4 are a second pair of successive frustoconical surfaces 53 and 54. Static pressure compensation at both subsonic and supersonic speeds is provided to one or more ports 35 by surfaces 53 and 54.

A cylindrical surface 55 extends back from the diametral plane at D4 to the outer end of streamlined strut 13. Diameters D2, D3, and D4 have magnitudes common to all of the probes in the family of probes shown in FIGS. 2A, 2B, and 2C.

A dashed line 57 represents the surface of the probe barrel as would exist prior to machining surfaces 51, 52, 53, 54 extending from a plane at D2 to a plane at D4.

In FIGS. 2A, 2B, and 2C, three representative probe barrels made according to the invention are shown and the figures show the respective angles between frustoconical surfaces 50, 51, 52, 53, 54 and the longitudinal axis of each barrel. The term "angle" is used herein to refer to the angle between the associated exterior surface of a frustoconical section and the longitudinal axis of the probe barrel measured in a radial plane passing through the longitudinal axis. Shown below these probes in FIGS. 2D and 2E are graphical representations of normalized subsonic and supersonic pressures as a function of position along the probe axis. Pressure plots labeled A, B, and C correspond to probe barrel surface configurations of FIGS. 2A, 2B, and 2C, respectively, and points on the probe surface correspond to points on the "position" axes of FIGS. 2D and 2E directly below them.

Before machining the surfaces 51, 52, 53, and 54, the three probe barrels shown in FIG. 2 share identical external structures (as illustrated in FIG. 3) with respect to the configuration of external surfaces 50 and 55, diameter D2, diameter D3, and diameter D4. Also, prior to finishing surfaces 51, 52, 53, and 54 of the probe barrels, the barrels each have a surface 57 (indicated by a dashed line) and do not have static pressure ports, so that at this stage of manufacture, the external configuration of each of the probe barrels in the family is identical in every respect. The internal construction of probe barrels shown in FIGS. 2A-2C is identical in every respect as exemplified by the internal construction shown in FIG. 3 including heaters, chambers, bulkheads, pressure tubes and so on.

It may be seen therefore, that, prior to finishing the probe to compensate it, the family of three probe barrels shown in FIGS. 2A, 2B, and 2C are identical in every respect. Finishing the probe barrel to compensate the measured static pressure for a particular application comprises machining surfaces 51, 52, 53 and 54 and removing material (drilling) to form ports 23 and 35. In order to avoid damage to internal components used with the probe when the ports are drilled, the location of the ports is limited to locations on surfaces 51 and 53. Heater element 46 is not wound inside of surfaces 51 and 53, and pressure tubes 18 and 37 are located away from the wall of the probe interior surfaces where damage to the tubes 18 and 37 could otherwise occur. Leads (not shown in the drawings) to the portion of heater 46 located at the front end portion of the probe are likewise routed through chambers 22 and 34 to avoid the areas where static pressure ports may be located.

This construction can be rapidly and economically manufactured since standard probe barrels for a variety of applications can be made up without a need to know in advance the compensation required. Once the compensation requirements for a job are determined, the probe barrel can be rapidly completed by machining external surfaces and drilling static pressure ports.

The corrugated design of FIG. 4 has variations in pressure near the static ports that vary rapidly with respect to distance along the probe axis at subsonic speed. There is also a rapidly varying pressure characteristic for this corrugated probe at supersonic speeds, however, the two rapidly varying characteristics will not generally match one another. When static port locations are selected on a probe as shown in FIG. 4 to provide matched subsonic compensation, it is found generally that the supersonic compensation for such port locations must be matched by trial and error. A new probe with a corrugated surface that has matched multiple compensation for both subsonic and supersonic speeds is desired and incorporates the present invention. Design of such a new probe as shown in FIG. 4 may be accomplished for each application by a trial and error method of testing in a wind tunnel. The positions of pressure sensing ports along the axis of the probe are varied in combination with variation of the shape of the corrugations on the surface of the probe until a desired combination is found. The combination of different corrugations for the two ports is selected to provide matched subsonic and matched supersonic compensation to the multiple sets of pressure sensing ports. The probe shown in FIG. 4 is similar to that shown in FIG. 1 and corresponding reference numerals identify the same features in both FIG. 1 and FIG. 4. A corrugation 60 is a first surface providing compensation to port 23 and a different corrugation 61 is a second surface providing compensation to port 35.

In the present invention, a desirable combination of dual static pressure sensing, easy selection of desired subsonic and supersonic compensation (either matched or unmatched), and either positive or negative compensation at both subsonic and supersonic flight speeds is achieved in a short compact probe. The terms "compensation" and "compensation pressure" refer to the pressure sensed or measured at a static pressure sensing port which has been selected to be offset (either positive, negative or zero) from the local static pressure in the vicinity of the probe to match the sensed pressure to the requirements of aircraft instrumentation.

In FIGS. 2A-2C and 3, a family of probes barrels are shown that have a forward frustoconical surface 50 with surface angle shown at 4 degrees, for example. Downstream or to the rear of this first surface are a pair of compensation surfaces 51 and 52 located successively along the probe barrel for providing compensation to a first set of static ports 23. First compensation surface 51 has an angle that is smaller than the angle of the first surface 50. As examples, angles of +2 degrees, 0 degrees, −2 degrees may be selected for surface 51, however angles from +5 degrees to −5 degrees may be used. The use of the word "smaller" with respect to angles means "less positive". First compensation surface 51 provides supersonic compensation that is relatively constant with respect to position along the probe barrel on surface 51. The supersonic compensation can be adjusted to be from positive to negative by selection of the angle of surface 51. This is shown in the "Supersonic Pressure Distribution" in FIG. 2E wherein it can be seen that variation of the angle of surface 51 from +2 degrees (in the probe of FIG. 2A) to 0 degrees (in the probe of FIG. 2B) to an even smaller angle of −2 degrees (in the probe of FIG. 2C) adjusts the supersonic compensation from a positive level (on the probe shown in FIG. 2A) to successively more negative compensation with smaller angles on probes shown in FIGS. 2B and 2C. The frustoconical surface 51 with a smaller angle than forward surface 50 produces relatively constant supersonic compensation without excessively increasing the barrel diameter.

Second compensation surface 52 is a transition surface that also provides subsonic compensation to static ports on surface 51. This subsonic compensation varies from negative to positive on surface 51 as can be seen from the "Subsonic Pressure Distribution" plot in FIG. 2D. The rapidity with which this compensation varies along the length of the barrel is controlled by selection of the angle of surfaces 51 and 52 with respect to the axis of the probe barrel. With surface 51 preselected to control supersonic compensation, the angle of surface 52 and the position of the ports 23 on surface 51 are selected to provide a particular subsonic compensation. Much of the trial and error is thus avoided in the design process. The shape of the surface between D2 and D3 provides one selected compensation pressure at subsonic speeds and another selected compensation pressure at supersonic speeds to ports 23.

In like manner, third compensation surface 53 is frustoconical and has an angle smaller than the angle of the surface 52 which precedes it. Surface 53 provides supersonic pressure compensation to static ports 35 on surface 53. Again, in the example, adjustment of supersonic compensation from positive to negative values is obtained by varying the angle of surface 53 from +2 degrees (in the probe shown in FIG. 2A) to 0 degrees (in the probe of FIG. 2B) to −2 degrees (in the probe of FIG. 2C). The "Supersonic Pressure Distribution" is shown in FIG. 2E at the position corresponding to surface 53 on the probes of FIGS. 2A, 2B, and 2C, and can be seen to be relatively constant over the surface 53 and adjustable from positive to negative pressure compensation values.

Fourth compensation surface 54 provides subsonic compensation to ports 35. The amplitude of the subsonic compensation is adjusted by selecting the angle of surface 54 and the position along the barrel axis of ports 35. The shape of the surface between D3 and D4 may be selected to provide compensation pressures at subsonic and supersonic speeds to ports 35 which substantially match the pressures at corresponding subsonic and supersonic speeds at ports 23. The shapes of the surfaces between D3 and D4 may also be selected to provide compensation pressures to ports 35 which are equally offset from the pressures at ports 23 at subsonic and supersonic speeds.

The pressure distributions of FIGS. 2D and 2E also show regions of subsonic pressure which vary along the probe axis and regions of relatively constant supersonic pressure along the probe axis on surfaces 52 and 54. Ports 23 and 35 may be located alternatively in regions of constant supersonic pressures on surfaces 52 and 54, respectively within the scope of this invention.

The successive positioning of two pairs of frustoconical compensation surfaces (51 and 52; 53 and 54) without successively increasing angles on those surfaces keeps the overall probe barrel at an acceptably small diameter and the weight at a minimum for a dual probe compensated for both subsonic and supersonic flight speeds. The invention as taught herein can also be used for probes with three or more sets of ports.

This family of probes share common construction and common external diameters at planes D2 and D4 and preferably common diameters also at plane D3. The surfaces 51, 52, 53, 54 are machined to the desired angle and static ports are drilled at desired locations to affect compensation in a finishing operation.

While probe barrel surfaces 50, 51, 52, 53, 54, 55 have been shown as frustoconical or cylindrical in the detailed description, it is within the scope of the invention to vary the shape of the cross section or tapers of the probe barrel so long as compensation is as taught in the invention. The probe barrel may also be extended to provide additional static sensing lines using the same compensation method.

What is claimed is:

1. A multiple static pressure-sensing probe for use at subsonic and supersonic velocities, the probe having mounting means at a rear portion thereof for mounting said probe in spaced relationship to an external surface in a fluid flow stream and having a probe barrel with a longitudinal axis, and a forward tapered external surface at a forward end, the probe barrel comprising:
   a first port, located on the probe barrel rearward of the forward tapered surface, for sensing static pressure at both subsonic and supersonic speeds;
   a second port, spaced rearward of the first port, for sensing static pressure at both subsonic and supersonic speeds;
   first surface means located rearward of the forward tapered surface and adjacent the first port and having a shape for providing to the first port a first selected compensation pressure at subsonic speeds and for providing to the first port a second selected compensation pressure at supersonic speeds, and;
   second surface means located rearward of the first surface means and adjacent the second port and having a shape for providing to the second port a third compensation pressure substantially equal to the first compensation pressure at subsonic speeds and for providing to the second port a fourth compensation pressure substantially equal to the second compensation pressure at supersonic speeds.

2. A multiple static probe as recited in claim 1 wherein the first and second surfaces comprise an annular smoothly curved corrugation formed on the outer surface of the barrel.

3. A multiple static probe as recited in claim 1 wherein the first port is located on the first surface and the second port is located on the second surface.

4. A multiple static sensing probe as recited in claim 3 wherein the first and second surfaces comprise annular smoothly curved corrugations formed on the outer surface of the barrel.

5. A multiple static pressure-sensing probe for use at subsonic and supersonic velocities, the probe having mounting means at a rear portion thereof for mounting said probe in spaced relationship to an external surface in a fluid flow stream and having a probe barrel with a longitudinal axis, and a forward external tapered surface tapering at an angle with the axis at a forward end, the probe barrel comprising:
   a first port on the probe barrel rearward of the forward tapered surface, for sensing static pressure at both subsonic and supersonic speeds;
   a second port rearward of the first port, for sensing static pressure at both subsonic and supersonic speeds;
   a first frustoconical surface, on the barrel rearward of the forward tapered surface, at an angle with the axis and having the first port thereon;
   a second frustoconical surface at an angle with the axis, on the barrel rearward of the first frustoconical surface, the first and second frustoconical surfaces providing both a first compensation pressure at subsonic speeds and a second compensation pressure at supersonic speeds to the first port;
a third frustoconical surface at an angle with the axis, on the barrel rearward of the second frustoconical surface, and having the second port thereon;
a fourth frustoconical surface at an angle with the axis, on the barrel rearward of the third frustoconical surface, the third and fourth surfaces providing both a third compensation pressure, substantially equal to the first pressure, at subsonic speeds and a fourth compensation pressure, substantially equal to the second pressure, at supersonic speeds to the second port.

6. A multiple static pressure sensing probe as recited in claim 5, wherein the angle between the first frustoconical surface and the axis is smaller than the angle between the forward external tapered surface and the axis.

7. A multiple static sensing probe as recited in claim 6, wherein the angle between the third frustoconical surface and the axis is less than the angle between the preceding surface and the longitudinal axis.

8. A multiple static pressure sensing probe as recited in claim 6 wherein the angle of the first and third frustoconical surfaces with respect to the longitudinal axis are both between plus five degrees and minus five degrees.

9. A method for manufacturing a multiple static pressure-sensing probe for use at subsonic and supersonic velocities, the probe comprising a metal elongated barrel having an internal bore divided into a plurality of separate chambers in series along the length of the barrel, and mounting means at one end of the barrel comprising the steps of:
fabricating the metal probe barrel to a substantially standard dimension with an unfinished external surface;
removing material from the external surface of the probe to form compensation surfaces at locations spaced along the barrel in locations corresponding to the separate internal chambers; and
machining through the barrel static pressure sensing ports to each of the separate chambers at location to provide selected, substantially matched sensing of static pressures at subsonic and supersonic velocities to each of such chambers.

10. The method of claim 9 including the steps of determining the pressure profile along the barrel in the region of the compensation surfaces prior to machining the static pressure sensing ports.

11. A multiple static pressure-sensing probe for use at subsonic and supersonic velocities, the probe having mounting means at a rear portion thereof for mounting said probe in spaced relationship to an external surface in a fluid flow stream and having a probe barrel with a longitudinal axis, and a forward external frustoconical surface at an angle with the axis at a forward end, the probe barrel comprising:
a first port on the probe barrel rearward of the forward tapered surface, for sensing static pressure at both subsonic and supersonic speeds;
a second port rearward of the first port, for sensing static pressure at both subsonic and supersonic speeds;
a first frustoconical surface, on the barrel rearward of the forward tapered surface, at an angle with the axis and having the first port thereon;
a second frustoconical surface at an angle with the axis, on the barrel rearward of the first frustoconical surface, the first and second frustoconical surfaces providing both a first compensation pressure at subsonic speeds and a second compensation pressure at supersonic speeds to the first port;
a third frustoconical surface at an angle with the axis, on the barrel rearward of the second frustoconical surface, and having the second port thereon;
a fourth frustoconical surface at an angle with the axis, on the barrel rearward of the third frustoconical surface, the third and fourth surfaces providing both a third compensation pressure, offset from the first pressure, at subsonic speeds and a fourth compensation pressure, substantially equally offset from the second pressure, at supersonic speeds to the second port.

* * * * *